United States Patent
Takushima (10) Patent No.: US 8,903,948 B2
(45) Date of Patent: Dec. 2, 2014

(54) DATA PROCESSING SYSTEM, INFORMATION TERMINAL, DATA PROCESSING METHOD, AND NON-TRANSITORY COMPUTER-READABLE STORAGE MEDIUM STORING DATA PROCESSING PROGRAM

(71) Applicant: DeNA Co., Ltd., Tokyo (JP)

(72) Inventor: Nobutaka Takushima, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 14/141,187

(22) Filed: Dec. 26, 2013

(65) Prior Publication Data

US 2014/0235351 A1  Aug. 21, 2014

(30) Foreign Application Priority Data

Feb. 19, 2013 (JP) ................. 2013-030440

(51) Int. Cl.
G06F 15/16 (2006.01)
A63F 13/30 (2014.01)
G06F 12/00 (2006.01)

(52) U.S. Cl.
CPC ................................ *A63F 13/12* (2013.01)
USPC .......................... 709/217; 709/218

(58) Field of Classification Search
USPC ......................... 709/217–229, 250
See application file for complete search history.

(56) References Cited

U.S. PATENT DOCUMENTS

| 6,085,234 | A | * | 7/2000 | Pitts et al. ..................... | 709/217 |
| 2006/0031833 | A1 | * | 2/2006 | Huang et al. .................. | 717/178 |
| 2009/0070356 | A1 | | 3/2009 | Mimatsu | |
| 2010/0107150 | A1 | | 4/2010 | Kamada et al. | |
| 2010/0138485 | A1 | * | 6/2010 | Chow et al. ................... | 709/203 |
| 2011/0177866 | A1 | | 7/2011 | Kim | |
| 2011/0296109 | A1 | * | 12/2011 | Sood et al. .................... | 711/118 |
| 2013/0031459 | A1 | * | 1/2013 | Khorashadi et al. .......... | 715/234 |
| 2014/0207566 | A1 | * | 7/2014 | Kamran et al. ............ | 705/14.45 |

FOREIGN PATENT DOCUMENTS

| JP | 2000-259421 A | 9/2000 |
| JP | 2007-133650 A | 5/2007 |

* cited by examiner

*Primary Examiner* — Zarni Maung

(57) ABSTRACT

The amount of communication between a server 10 and an information terminal 30 is reduced. After asset data has been updated by a data updating unit 14, the server 10 transmits identification information and version information for the asset data to the information terminal 30. The information terminal 30 determines whether the received version information is stored in a browser cache 36. When the received version information is not stored in the browser cache 36, the information terminal 30 requests the server 10 to transmit the asset data associated with the version information. When the received version information is stored in the browser cache 36, the information terminal 30 does not request the server 10 to transmit the asset data associated with the version information.

6 Claims, 4 Drawing Sheets

DATA PROCESSING SYSTEM, INFORMATION TERMINAL, DATA PROCESSING METHOD, AND NON-TRANSITORY COMPUTER-READABLE STORAGE MEDIUM STORING DATA PROCESSING PROGRAM

BACKGROUND OF THE INVENTION

1. Field of the Invention

The present invention relates to a data processing system including an information terminal and a server connected to the information terminal through a network, an information terminal, a data processing method, and a non-transitory computer-readable storage medium storing a data processing program.

2. Description of Related Art

There is known a process in which data obtained once from a server is stored in a browser cache using a browser's cache function to save time and trouble obtaining the data stored in the browser cache again. In "https://developers.google.com/speed/docs/best-practices/caching", there is disclosed a technique in which a hash value or the like which is associated with the last update date and version information of data to be stored in a browser cache is managed, and when data to be obtained is stored in the cache, the data stored in the cache is used without obtaining the data through a communication network.

In addition, in the game field, there is known a process in which a game is performed such that asset data such as image data used in the game is stored on the console side when the game is first used, and upon the occurrence of an update to the asset data, the console side is allowed to download the updated data through a communication network by a patch process.

Here, in a game using an information terminal connected to a server through a network, a type of game (so-called "native application type game") that is performed by downloading an application storing game information to the information terminal from the server has proliferated.

A game called "social game" which is such a native application type game and which is performed using a large number of registered user data has proliferated. In a social game, an update to character data, and the like are frequently performed on the server. Hence, an information terminal performing the game needs to frequently acquire updated data from the server, resulting in lots of communication taking place between the server and the information terminal.

SUMMARY OF THE INVENTION

In such circumstances, it is desirable that an information terminal be able to efficiently acquire data which is updated on the server side whenever necessary, from the server.

One aspect of the present invention is directed to a data processing system including an information terminal and a server connected to the information terminal through a network, wherein the server includes: a server storage unit that stores a plurality of asset data; and an updating unit that generates, along with an update to asset data, version information for the updated asset data, the information terminal includes: a browser unit that receives asset data by communicating with the server through the network; and a terminal storage unit that stores asset data, identification information identifying the asset data, and version information for the asset data in association with one another, and includes a browser cache that is used by the browser unit and that stores identification information identifying asset data and version information for the asset data in association with each other; and a native cache that is provided separately from the browser cache and is managed independently of the browser unit and that stores asset data and identification information identifying the asset data in association with each other, the server transmits, before transmitting asset data to the information terminal, identification information identifying the asset data to be transmitted and version information for the asset data, to the information terminal, and the information terminal, determines whether the received version information is stored in the terminal storage unit; requests, when the received version information is not stored in the terminal storage unit, the server to transmit the asset data associated with the version information; and does not request, when the received version information is stored in the terminal storage unit, the server to transmit the asset data associated with the version information.

Another aspect of the present invention is directed to an information terminal that receives asset data from a server by establishing a connection to the server through a network, the information terminal including: a browser unit that receives asset data by communicating with the server through the network; and a terminal storage unit that stores asset data, identification information identifying the asset data, and version information for the asset data in association with one another, and includes a browser cache that is used by the browser unit and that stores identification information identifying asset data and version information for the asset data in association with each other; and a native cache that is provided separately from the browser cache and is managed independently of the browser unit and that stores asset data and identification information identifying the asset data in association with each other, wherein the information terminal: receives, before receiving asset data from the server, identification information identifying the asset data to be received and version information for the asset data, from the server; determines whether the received version information is stored in the terminal storage unit; requests, when the received version information is not stored in the terminal storage unit, the server to transmit the asset data associated with the version information; and does not request, when the received version information is stored in the terminal storage unit, the server to transmit the asset data associated with the version information.

Yet another aspect of the present invention is directed to a data processing method for an information terminal and a server connected to the information terminal through a network, wherein the server includes: a server storage unit that stores a plurality of asset data; and an updating unit that generates, along with an update to asset data, version information for the updated asset data, the information terminal includes: a browser unit that receives asset data by communicating with the server through the network; and a terminal storage unit that stores asset data, identification information identifying the asset data, and version information for the asset data in association with one another, and includes a browser cache that is used by the browser unit and that stores identification information identifying asset data and version information for the asset data in association with each other; and a native cache that is provided separately from the browser cache and is managed independently of the browser unit and that stores asset data and identification information identifying the asset data in association with each other, the server transmits, before transmitting asset data to the information terminal, identification information identifying the asset data to be transmitted and version information for the asset data, to the information terminal, and the information terminal, determines whether the received version information is stored in the terminal storage unit; requests, when the received version information is not stored in the terminal storage unit, the server to transmit the asset data associated with the version information; and does not request, when the received version information is stored in the terminal storage unit, the server to transmit the asset data associated with the version information.

Another aspect of the present invention is directed to a non-transitory computer-readable storage medium storing a data processing program executed by an information terminal that receives asset data from a server by establishing a connection to the server through a network, wherein the information terminal includes: a browser unit that receives asset data by communicating with the server through the network; and a terminal storage unit that stores asset data, identification information identifying the asset data, and version information for the asset data in association with one another, and includes a browser cache that is used by the browser unit and that stores identification information identifying asset data and version information for the asset data in association with each other; and a native cache that is provided separately from the browser cache and is managed independently of the browser unit and that stores asset data and identification information identifying the asset data in association with each other, and the data processing program causes the information terminal to: receive, before receiving asset data from the server, identification information identifying the asset data to be received and version information for the asset data, from the server; determine whether the received version information is stored in the terminal storage unit; request, when the received version information is not stored in the terminal storage unit, the server to transmit the asset data associated with the version information; and not request, when the received version information is stored in the terminal storage unit, the server to transmit the asset data associated with the version information.

In the data processing program, when received version information is stored in the terminal storage unit, a request to transmit asset data associated with the version information is not made to the server.

In addition, it is preferred that the terminal storage unit include a browser cache that is used by the browser unit and that stores identification information identifying asset data and version information for the asset data in association with each other; and a native cache that is provided separately from the browser cache and is managed independently of the browser unit and that stores asset data and identification information identifying the asset data in association with each other.

According to the present invention, the amount of communication between the server and the information terminal is reduced and thus data can be efficiently updated.

DETAILED DESCRIPTION OF THE INVENTION

An embodiment of the present invention will be described below based on the drawings.

<Overall Configuration of a System>

Figure 1:
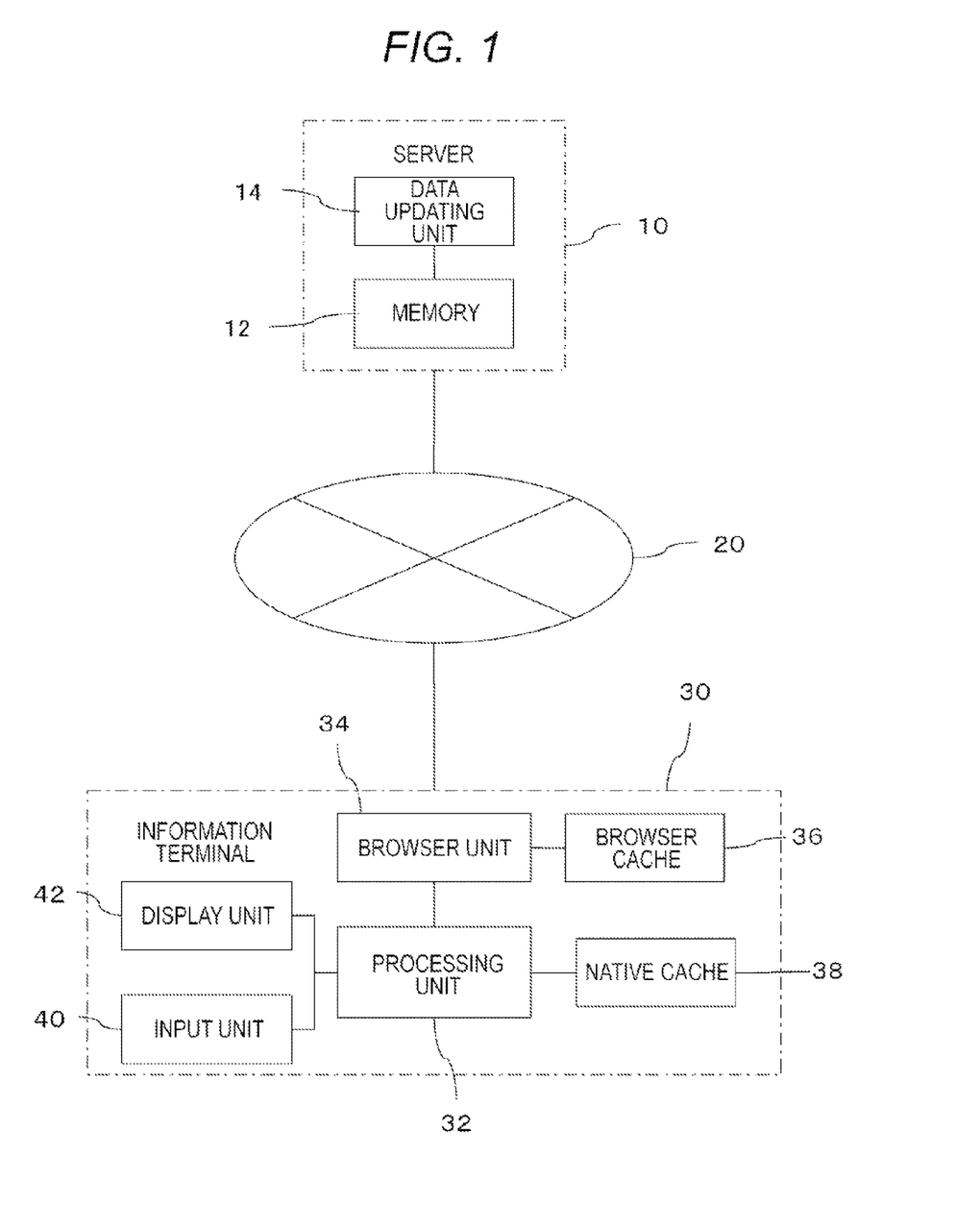
FIG. 1 is a block diagram showing a configuration of a data processing system according to an embodiment.

FIG. 1 is a block diagram showing a schematic configuration of a data processing system according to the present embodiment. A server 10 is connected to a network 20, and an information terminal 30 is connected to the network 20. The information terminal 30 acquires required data from the server 10 through the network 20 to perform processes for a game, etc.

Note that although the present embodiment describes an example in which the information terminal 30 performs a game, the scope of application of the present invention is not limited thereto and includes any mode where data which is updated whenever necessary is communicated between the server 10 and the information terminal 30.

<Configuration and Functions of the Server>

The server 10 is a computer and has various types of data processing function, communication function, and storage function. A memory 12 of the server 10 stores game logic, user data used when the game is performed, and asset data.

The asset data includes, for example, image data, moving images (animation data), etc. The asset data is not limited to those data, but when data is one whose data volume is larger than that of document data, etc., the effect of the present invention becomes more noticeable.

In general, in a social game, game logic for performing the game is not basically changed frequently, but asset data such as image data and moving images (animation data) is changed whenever necessary. Specifically, asset data is updated such that the asset data is changed by a developer, etc., whenever necessary, and existing asset data in the memory 12 is rewritten with new asset data whenever necessary. In order to reflect such asset data having been changed in the game performed on the information terminal 30, the asset data needs to be transmitted to the information terminal 30 from the server 10.

Note that a computer of the developer may be connected to the server 10 through the network 20, but may be connected to the server 10 through other communication lines such as an internal LAN and wireless communication.

The server 10 includes a data updating unit 14. The data updating unit 14 manages updates to the data in the memory 12. Specifically, when the data updating unit 14 receives updated data, the data updating unit 14 updates corresponding data in the memory 12. Here, the update to data is basically premised on an update to asset data. Here, asset data is saved such that one image, one moving image, etc., being one unit is saved as one file, and each file is assigned attribute information such as update time and file volume in addition to file name. Namely, existing asset data and new asset data can be associated with each other based on the attribute information. For example, when asset data saved in the memory 12 is updated, old asset data is updated with new asset data, and the same file name as that of the updated old asset data is assigned to the new asset data, by which the old asset data and the new asset data are associated with each other.

When the server 10 transmits data, the server 10 computes hash values for the transmit data on a file-by-file basis, and transmits the hash values which are the computation results, together with the files.

The data updating unit 14 computes hash values from the data itself or attribute information of files, and transmits the hash values in association with the files. Note that a hash value may be calculated from asset data (image data, moving image data, etc.) contained in a file or attribute information about the file, but it is preferred to calculate a hash value from the asset data itself. Namely, when asset data is updated, a hash value calculated from the asset data itself becomes different from a hash value calculated from pre-update asset data itself, and thus, the hash value serves as version information indicating the version of the asset data itself. By comparing the hash values, it can be securely grasped whether the asset data has been updated.

Here, it is also preferred that every time a file is updated, a hash value for the file be computed and stored in the memory 12 in association with the file. By doing so, when a file transmission request is made, an already stored hash value can also be transmitted. In addition, hash values for the files in the memory 12 may be computed and updated every certain period. Furthermore, a hash value which is re-computed when a file is transmitted may be associated with the file and thereby updated.

Note that although the present embodiment shows an example of processing one file as unit data, processing may be performed by calculating hash values on a unit-data-by-unit-data basis with unit data including a plurality of files.

Note also that although in the present embodiment a hash value is applied as version information, version information may be one that changes according to changed asset data (file). For example, as version information, file update date/time, a unique number assigned upon file update, a checksum, a check digit, a fingerprint, etc., may be used.

A creator of asset data connects his/her computer to the server 10 to rewrite data in the memory 12 whenever necessary. When the data updating unit 14 is requested by the information terminal 30 to provide data, the data updating unit 14 computes a hash value for the data, based on unit data including a file to be transmitted, and transmits the hash value to the information terminal 30.

For example, an API such as that shown below is prepared for the data updating unit 14.

_get_bundle?paths=a,b,c,d --->{a: {hash: md5, body: base64}...}

When the API is called by access from the information terminal 30, the hash value "md5" is computed and used as the version information of the file "a". By doing so, in the case in which the file "a" has been replaced, when a corresponding file is transmitted to a user thereafter, the hash value "md5" for the transmit data is transmitted to the information terminal 30 and is stored in the information terminal 30.

<Configuration and Functions of the Information Terminal>

The information terminal 30 is a terminal device including a computer such as a mobile phone, a smartphone, or a tablet, and a processing unit 32 including a CPU performs basic data processing.

The information terminal 30 is provided with a browser unit 34. Various types of processes such as image display can be performed by the browser unit 34 establishing a connection to the server 10 through the network (e.g., the Internet) 20. In addition, the browser unit 34 is provided with a browser cache (browser storage unit) 36. The browser cache 36 is used to store valid data when the browser unit 34 performs various types of processes.

The information terminal 30 is provided with a native cache 38, and the stored content of the native cache 38 is managed by the processing unit 32. In addition, the information terminal 30 is provided with an input unit 40 and a display unit 42. The input unit 40 and the display unit 42 perform required data input and various types of display. For example, the display unit 42 is a liquid crystal or organic EL panel, and the input unit 40 is a touch panel provided to the display unit 42.

When a user of the information terminal 30 starts a game, the user specifies an URL, by which the browser unit 34 accesses the server 10 which is the provider of the game program, to download an application storing the game program from the server 10.

The game program is stored in the native cache 38. By the processing unit 32 executing the game program, the browser unit 34 communicates with the server 10 to obtain required asset data such as images and moving images, and the game progresses while the images are displayed on the display unit 42. In this example, logic for performing the game is present on the side of the server 10. When the information terminal 30 is connected to the server 10 through the browser unit 34, the server 10 sequentially provides required data to the information terminal 30. In addition, data from the information terminal 30 is also provided to the server 10 through the browser unit 34.

Here, as described above, the server 10 stores files containing asset data and hash values calculated for the files such that the files are associated with the hash values, respectively. When the server 10 is requested by the information terminal 30 for asset data, the server 10 transmits the asset data added, as metadata, with a hash value which is associated with the asset data when transmitting a file containing the requested asset data.

The processing unit 32 of the information terminal 30 allows the native cache 38 to store the received file (asset data) and hash value in association with a file name in a data table, etc. In addition, in order to reduce the load of a display process on the information terminal 30, the browser unit 34 stores in the browser cache 36 the file names and hash values of some or all of the files stored in the native cache 38.

Here, asset data acquired by the information terminal 30 includes data operable by the user and data inoperable by the user (data specific to the game). The inoperable data is not highly likely to be often used by the browser unit 34. Thus, it is preferred that the inoperable data be stored in the native cache 38 instead of in the browser cache 36.

<Procedure for Obtaining Data>

With reference to a flowchart of FIG. 2, the process of obtaining, by the information terminal 30, asset data from the server 10 through the network 20 will be described below. In the present embodiment, description is made assuming that the browser unit 34 accesses the server 10 for each page to be displayed in a game, to obtain asset data for displaying the page.

When an application for the game is executed on the information terminal 30, the information terminal 30 and the server 10 are connected to each other through the network 20 such that they can transmit and receive information to/from each other. Here, as shown in FIG. 3, when a state in which one page is displayed on the information terminal 30 transitions to a state in which the next page is displayed, required asset data is provided to the information terminal 30 from the server 10 through the browser unit 34.

First, the file names (file1, file2, . . . ) of files containing asset data required to display the next page and hash values (version information) for the files are transmitted to the information terminal 30 from the server 10 such that the file names and the hash values are associated with each other. For example, in the case of including the file name "file1" and the hash value "hash1" associated therewith and the file name "file2" and the hash value "hash2" associated therewith, data such as (<html> file1 hash, file2 hash, . . . ) is transmitted.

At this time, it is preferred to compute hash values for the files upon transmission and transmit the calculated hash values, pairing with the file names. By this, hash values calculated based on the latest asset data upon transmission can be securely transmitted. Meanwhile, when a certain amount of time lag is allowed, hash values may be calculated in advance, and the files and the hash values may be stored in the memory 12 in association with each other, and upon transmission file names and hash values associated therewith may be read and transmitted. In this case, it becomes unnecessary for the server 10 to calculate hash values for each transmission, enabling to reduce the load of arithmetic processing by the server 10.

As such, before transmitting the files of asset data required to display the next page, the file names which are identification information unique to the files and the hash values which are the version information of the files are transmitted without transmitting the asset data which is the body (contents) of the files, and the file names and the hash values are obtained by the browser unit 34.

The browser unit 34 determines whether the same hash value as a received hash value is stored in the browser cache 36 or the native cache 38. If the determination result shows that the same hash value is stored, it can be determined that for a file having a file name associated with the hash value, the latest asset data is already stored in the native cache 38. In this case, the asset data of the file does not need to be obtained again from the server 10. Hence, the browser unit 34 obtains the asset data of the corresponding file from the native cache 38 through the processing unit 32 without obtaining the corresponding file from the server 10, to display the next page.

Note that when identicalness between hash values is determined, identicalness between file names may also be simultaneously determined Specifically, the browser unit 34 may determine whether the same pair of a file name and a hash value as a received pair of a file name and a hash value is stored in the browser cache 36 or the native cache 38. By this, for asset data of the same file identified by the file name, identicalness of the data can be checked using hash values, enabling to more securely determine whether asset data is the latest one.

Figure 2:
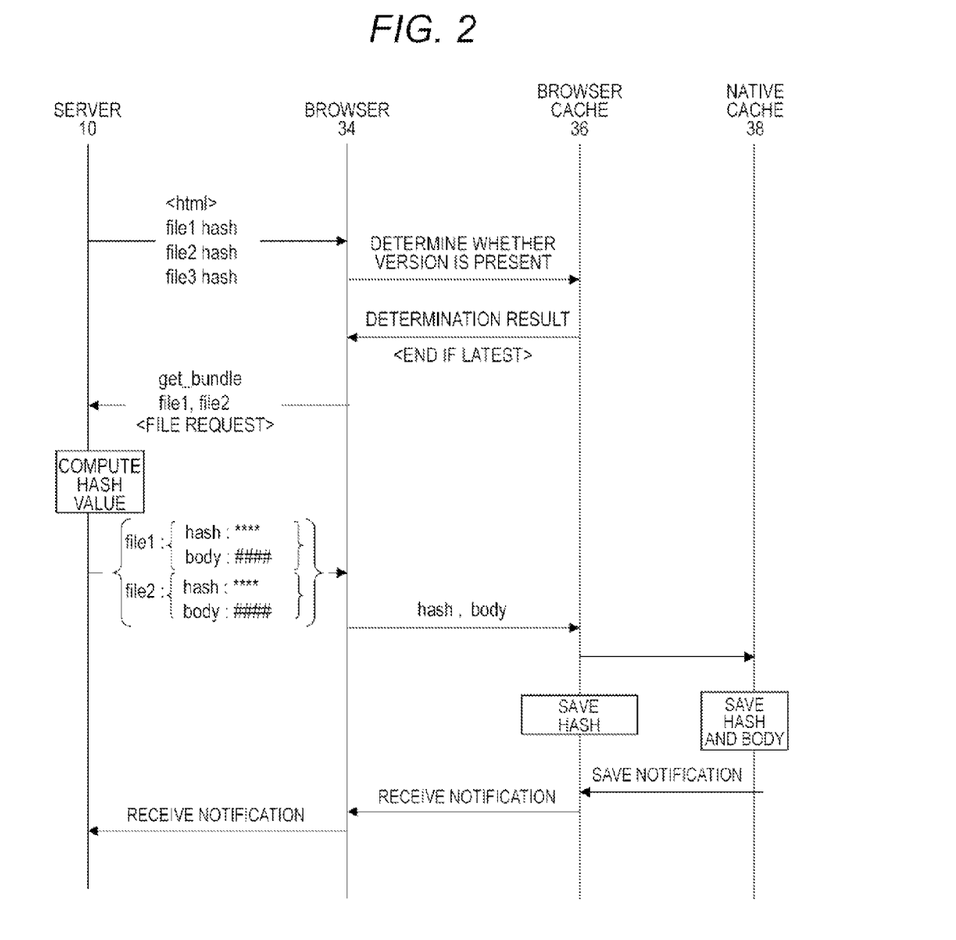
FIG. 2 is a chart describing exchange of data.
Figure 3:
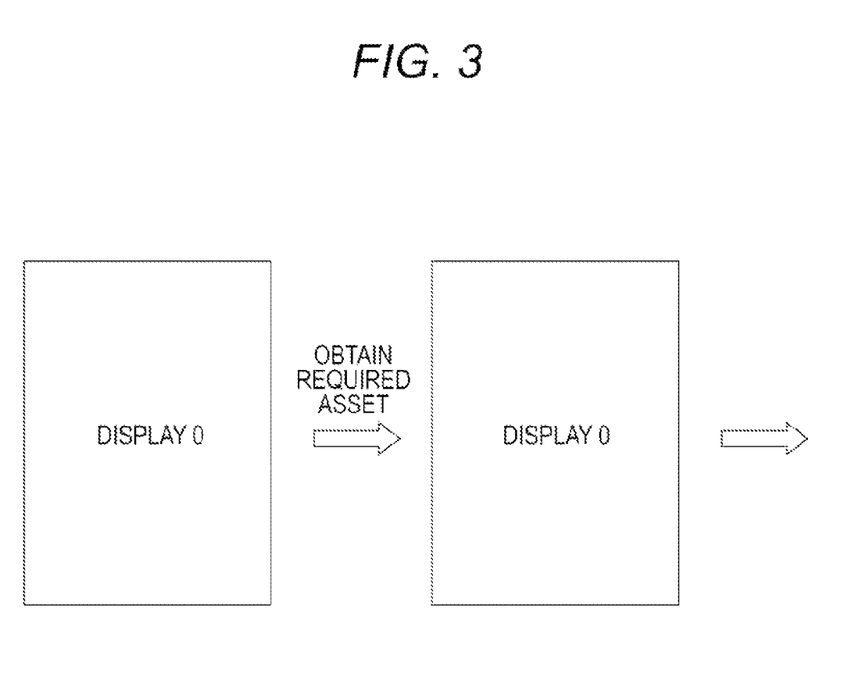
FIG. 3 is a diagram describing switching of pages.

The example of FIG. 2 shows the case in which for the file "file3" a file having the same hash value as the file "file3" is already registered, and for the files "file1" and "file2" there are no files having the same hash values as the files "file1" and "file2". In this case, the browser unit 34 transmits a request to obtain only two files "file1" and "file2" to the server 10. In this example, using AJAX (Asynchronous JavaScript+XML), a request such as _get bundle file1, file2 is transmitted to the server 10.

In response to the request, the server 10 reads the corresponding files "file1" and "file2" from the memory 12 and transmits the files to the information terminal 30. Hash values are computed for the read files, and the files and the hash values for the files are provided as sets to the browser unit 34 of the information terminal 30. Specifically, for the files "file1" and "file2", their respective hash values "hash" and asset data "body" serving as the body (contents) of the files together are provided to the browser unit 34.

Here, it is preferred that the data updating unit 14 of the server 10 compute hash values at the transmission stage and transmit the hash values obtained by the computation. By this, the hash values to be transmitted are hash values obtained for the latest asset data at that point in time. Therefore, it is ensured that hash values stored in the information terminal 30 are provided for asset data of the latest version.

On the other hand, when a certain amount of time lag is allowed, hash values may be calculated in advance, and asset data and the hash values may be stored in the memory 12 in association with each other, and upon transmission files containing asset data and hash values associated therewith may be read and transmitted. In this case, it becomes unnecessary for the server 10 to calculate hash values for each transmission, enabling to reduce the load of arithmetic processing by the server 10.

The browser unit 34 stores only the file names and the hash values in the browser cache 36 from the provided files and hash values which are version information. On the other hand, the file names, the file body, and the hash values are stored in the native cache 38. Note that the hash values do not necessarily need to be stored in the native cache 38.

By performing such processes, the browser unit 34 receives the completion of saving by the browser cache 36 and the native cache 38, and transmits a receive notification to the server 10.

As such, every time the user performs a certain operation for the game using the information terminal 30, communication with the server 10 is performed by the browser unit 34, according to an application executed on the information terminal 30.

Then, instead of transmitting data of a file required to display a page as it is from the server 10, a file name and a hash value associated therewith are transmitted first. Using the hash value, it is determined whether a corresponding file (file body) is stored in the native cache 38. If stored, a request to transmit the file body is not made to the server 10. By this, the amount of data communicated can be significantly reduced.

In addition, by storing asset data itself which is the body of files in the native cache 38, files can be cached without worrying about data volume, compared to the case of using only the browser cache 36. Furthermore, access to the native cache 38 from both of the browser unit 34 and the processing unit 32 is allowed, and the processing unit 32 can, for example, check whether data stored in the native cache 38 is not corrupted, independently of the browser unit 34, and other uses are also possible. In addition, since basically there is no limitation on the capacity of the native cache 38 and thus the native cache 38 can have a large capacity, even if the amount of data to be cached is large, there is no problem. Thus, moving image data, etc., can also be easily cached.

Note that although the present embodiment describes an example in which asset data is requested on a per page display basis, the configuration is not limited thereto, and asset data required to display a plurality of pages may be obtained all at once.

<Effects of the Embodiment>

As such, in the present embodiment, effects such as those shown below can be obtained.

Since the native cache 38 can store asset data which is the body of files, even if the capacity of the browser cache 36 is small, there is very little problem.

The browser cache 36 is used by the browser unit 34 and thus is difficult to be controlled by the processing unit 32, etc., provided external to the browser unit 34. In the present embodiment, such a problem does not occur because an application can use asset data stored in the native cache 38 and thus it becomes unnecessary to handle data stored in the browser cache 36 from the application. In particular, by allowing the native cache 38 to be shared between the browser unit 34 and the processing unit 32, efficient processes can be performed, enabling to prevent the occurrence of wasted communication with the server 10.

Upon activation of an application for a game, etc., only downloading of the application is required and any special processes such as downloading of large volume data are not required, enabling to reduce activation time.

Even during activation of an application, asset data, etc., can be updated and thus the latest data at the point in time when required by a user can be supplied.

<Variants>

When there is provided a means of determining, upon access from the information terminal 30, whether the access is the first access for the game, in the first response, data to be transmitted may be converted to JSON (JavaScript Object Notation) and hash values and the data may be transferred at a time.

In the server 10, if there is a query during calculation of a hash value, the case in which the server 10 sends back an old hash value may also be assumed.

For example, when, for a file version, a fingerprint which is independent of a file system is used, (1) a new file may be placed in a preparation directory tree, (2) a hash value for the added file may be calculated, and (3) when the hash value is calculated, the file is placed in a release directory tree.

In addition, the case in which a plurality of files is inseparably updated may be handled in a manner such as that described above.

Furthermore, in the above-described processes, data stored in the browser cache 36 and data stored in the native cache 38 may be optimized. For example, data with a low frequency of update that is not influenced by a user operation is stored in the native cache 38 so that the data can be directly accessed from the native, and data with a high frequency of update is stored in the browser cache 36, enabling to achieve a reduction in transfer rate from the browser unit 34 to the native.

Figure 4:
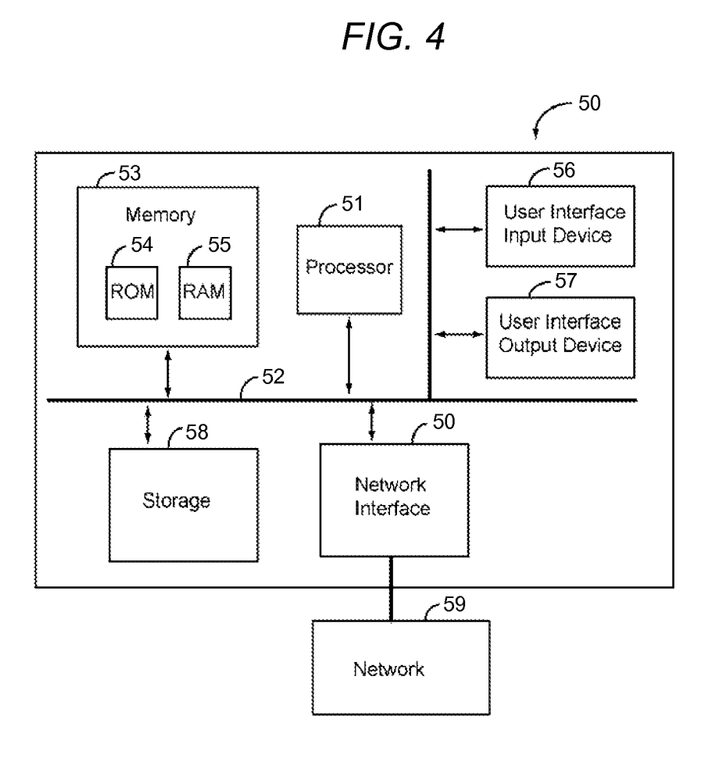
FIG. 4 illustrates an embodiment of the present invention implemented in a computer system.

An embodiment of the present invention may be implemented in a computer system, e.g., as a computer readable medium. As shown in in FIG. 4, a computer system 50 may include one or more of a processor 51, a memory 53, a user input device 56, a user output device 57, and a storage 58, each of which communicates through a bus 52. The computer system 50 may also include a network interface 50 that is coupled to a network 59. The processor 51 may be a central processing unit (CPU) or a semiconductor device that executes processing instructions stored in the memory 53 and/or the storage 58. The memory 53 and the storage 58 may include various forms of volatile or non-volatile storage media. For example, the memory may include a read-only memory (ROM) 54 and a random access memory (RAM) 55.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

Even if the processes and the procedures described herein are executed by a single apparatus, software piece, component, or module, such processes and procedures may also be executed by a plurality of apparatuses, software pieces, components, and/or modules. Even if the data, tables, or databases described herein are stored in a single memory, such data, tables, or databases may also be dispersed and stored in a plurality of memories included in a single apparatus or in a plurality of memories dispersed and arranged in a plurality of apparatuses. The elements of the software and the hardware described herein can be integrated into fewer constituent elements or can be decomposed into more constituent elements.

What is claimed is:

1. A data processing system comprising an information terminal and a server connected to the information terminal through a network, wherein the server includes:

a server storage unit that stores a plurality of asset data; and an updating unit that generates, along with an update to asset data, version information for the updated asset data, the information terminal includes:

a browser unit that receives asset data by communicating with the server through the network; and a terminal storage unit that stores asset data, identification information identifying the asset data, and version information for the asset data in association with one another, and includes a browser cache that is used by the browser unit and that stores identification information identifying asset data and version information for the asset data in association with each other; and a native cache that is provided separately from the browser cache and is managed independently of the browser unit and that stores asset data and identification information identifying the asset data in association with each other, the server transmits, before transmitting asset data to the information terminal, identification information identifying the asset data to be transmitted and version information for the asset data, to the information terminal, and the information terminal:

determines whether the received version information is stored in the terminal storage unit;

requests, when the received version information is not stored in the terminal storage unit, the server to transmit the asset data associated with the version information; and does not request, when the received version information is stored in the terminal storage unit, the server to transmit the asset data associated with the version information.

2. The data processing system according to claim 1, wherein the version information includes a hash value calculated from the asset data.

3. The data processing system according to claim 2, wherein the updating unit re-computes the hash value in fixed cycles.

4. An information terminal that receives asset data from a server by establishing a connection to the server through a network, the information terminal comprising:

a browser unit that receives asset data by communicating with the server through the network; and a terminal storage unit that stores asset data, identification information identifying the asset data, and version information for the asset data in association with one another, and includes a browser cache that is used by the browser unit and that stores identification information identifying asset data and version information for the asset data in association with each other; and a native cache that is provided separately from the browser cache and is managed independently of the browser unit and that stores asset data and identification information identifying the asset data in association with each other, wherein the information terminal:

receives, before receiving asset data from the server, identification information identifying the asset data to be received and version information for the asset data, from the server;

determines whether the received version information is stored in the terminal storage unit;

requests, when the received version information is not stored in the terminal storage unit, the server to transmit the asset data associated with the version information; and does not request, when the received version information is stored in the terminal storage unit, the server to transmit the asset data associated with the version information.

5. A data processing method for an information terminal and a server connected to the information terminal through a network, wherein the server includes:

a server storage unit that stores a plurality of asset data; and an updating unit that generates, along with an update to asset data, version information for the updated asset data, the information terminal includes:

a browser unit that receives asset data by communicating with the server through the network; and a terminal storage unit that stores asset data, identification information identifying the asset data, and version information for the asset data in association with one another, and includes a browser cache that is used by the browser unit and that stores identification information identifying asset data and version information for the asset data in association with each other; and a native cache that is provided separately from the browser cache and is managed independently of the browser unit and that stores asset data and identification information identifying the asset data in association with each other, the server transmits, before transmitting asset data to the information terminal, identification information identifying the asset data to be transmitted and version information for the asset data, to the information terminal, and the information terminal:

determines whether the received version information is stored in the terminal storage unit;

requests, when the received version information is not stored in the terminal storage unit, the server to transmit the asset data associated with the version information; and does not request, when the received version information is stored in the terminal storage unit, the server to transmit the asset data associated with the version information.

6. A non-transitory computer-readable storage medium storing a data processing program executed by an information terminal that receives asset data from a server by establishing a connection to the server through a network, wherein the information terminal includes:

a browser unit that receives asset data by communicating with the server through the network; and a terminal storage unit that stores asset data, identification information identifying the asset data, and version information for the asset data in association with one another, and includes a browser cache that is used by the browser unit and that stores identification information identifying asset data and version information for the asset data in association with each other; and a native cache that is provided separately from the browser cache and is managed independently of the browser unit and that stores asset data and identification information identifying the asset data in association with each other, and the data processing program causes the information terminal to:

receive, before receiving asset data from the server, identification information identifying the asset data to be received and version information for the asset data, from the server;

determine whether the received version information is stored in the terminal storage unit;

request, when the received version information is not stored in the terminal storage unit, the server to transmit the asset data associated with the version information; and not request, when the received version information is stored in the terminal storage unit, the server to transmit the asset data associated with the version information.

* * * * *